United States Patent
Stephens et al.

(10) Patent No.: US 9,074,124 B2
(45) Date of Patent: Jul. 7, 2015

(54) CERAMIC PARTICLES AND METHODS FOR MAKING THE SAME

(75) Inventors: Walter T. Stephens, Cleveland, OH (US); Kevin R. Dickson, Little Rock, AR (US); Tihana Fuss, Stow, OH (US); Ian Jaeger, Richardson, TX (US); Danny Louis Mickelson, Alma, AR (US); Suchira Sen, Kolkata (IN); Thomas Szymanski, Hudson, OH (US)

(73) Assignee: Saint-Gobain Ceramics & Plastics, Inc, Inc., Worcester, MA (US)

(*) Notice: Subject to any disclaimer, the term of this patent is extended or adjusted under 35 U.S.C. 154(b) by 374 days.

(21) Appl. No.: 13/576,412

(22) PCT Filed: Feb. 8, 2011

(86) PCT No.: PCT/US2011/023957
§ 371 (c)(1),
(2), (4) Date: Oct. 12, 2012

(87) PCT Pub. No.: WO2011/100203
PCT Pub. Date: Aug. 18, 2011

(65) Prior Publication Data
US 2013/0123152 A1    May 16, 2013

Related U.S. Application Data

(60) Provisional application No. 61/303,097, filed on Feb. 10, 2010.

(51) Int. Cl.
*C09K 8/74*      (2006.01)
*C09K 8/00*      (2006.01)
(Continued)

(52) U.S. Cl.
CPC ............. *C09K 8/80* (2013.01); *C04B 35/62655* (2013.01); *C04B 35/62695* (2013.01); *C04B 35/62813* (2013.01); *C04B 35/636* (2013.01); *C04B 2235/3217* (2013.01); *C04B 2235/3418*
(Continued)

(58) Field of Classification Search
CPC .... C09K 8/80; Y10S 507/906; Y10S 507/924
USPC .................................. 507/269, 140, 906, 924
See application file for complete search history.

(56) References Cited

U.S. PATENT DOCUMENTS

2005/0000690 A1 *   1/2005  Boney ................... 166/280.2
2010/0304951 A1    12/2010  Kitazawa

FOREIGN PATENT DOCUMENTS

WO    WO 2008047868 A1 *  4/2008
WO       2009/029704 A1     3/2009

*Primary Examiner* — Aiqun Li

(57) ABSTRACT

Disclosed is a population of ceramic particles that includes a plurality of individual, free flowing particles. The plurality has a total weight and particle size distribution. The effective width of the distribution is the difference between the distribution's $d_{95}$ and $d_5$ particle sizes. The distribution's effective width exceeds 100 microns and includes three abutting and non-overlapping regions that include a first region, a second region, and a third region. The first region abuts the second region and the second region abuts the third region. The width of the second region is at least 25% of the effective width. The weight of particles in the second region does not exceed 15% of the plurality of particle's total weight. The weight of particles in the first region and the third region each exceed the weight of particles in the second region. Methods of making the populations of ceramic particles are also disclosed.

19 Claims, 2 Drawing Sheets

(51) Int. Cl.
*C09K 8/80* (2006.01)
*C04B 35/626* (2006.01)
*C04B 35/628* (2006.01)
*C04B 35/636* (2006.01)

(52) U.S. Cl.
CPC ............ (2013.01); *C04B 2235/528* (2013.01); *C04B2235/5296* (2013.01); *C04B 2235/5427* (2013.01); *C04B 2235/5436* (2013.01); *C04B 2235/5472* (2013.01)

US 9,074,124 B2

CERAMIC PARTICLES AND METHODS FOR MAKING THE SAME

CROSS-REFERENCE TO RELATED APPLICATION

This application claims the benefit of U.S. Provisional Application No. 61/303,097 filed Feb. 10, 2010.

BACKGROUND OF THE INVENTION

Populations of ceramic particles may be used in a wide variety of industrial processes and products including, for example: abrasive media; as a granular coating for asphalt based roofing shingle; as filtration medium for liquids; as a substitute for sand in investment casting processes; and as proppants in a down hole drilling operations where the ceramic particles may be referred to as proppants. Proppants made from ceramic particles may be used in deep wells where the pressure exerted on the ceramic proppant exceeds the crush resistance of conventional proppants such as sand and resin coated sand.

Examples of patents and published patent applications directed to proppants include: U.S. Pat. No. 3,376,930; U.S. Pat. No. 4,632,876; U.S. Pat. No. 7,067,445; U.S. Pat. No. 7,528,096; US 2006/0177661 and US 2008/0000638.

SUMMARY

Embodiments of the present invention include populations of particles having certain characteristics to improve crush strength, conductivity, and resistance to settling while also lowering manufacturing cost for the producer of the ceramic particles. Populations of ceramic particles described herein can be created using conventional equipment and raw materials.

One embodiment of the present invention comprises populations of ceramic particles comprising a plurality of individual, free flowing particles. The plurality of particles having a total weight and particle size distribution including $d_{95}$ and $d_5$ particle sizes. The distribution has an effective width which is the difference between the distribution's $d_{95}$ and $d_5$ particle sizes. The distribution's effective width exceeds 100 microns and comprises three abutting and non-overlapping regions including a first region, a second region, and a third region. The first region abuts the second region and the second region abuts the third region. The width of the second region is at least 25% of the effective width. The weight of particles in the second region does not exceed 15% of the population's total weight and the weight of particles in the first region and the third region each exceed the weight of particles in the second region.

Another embodiment of the present invention relates to a process for manufacturing a population of ceramic particles. The process may include the following steps. Providing an initial population of particles having a total weight and particle size distribution. Separating the initial population of particles into at least three portions, identified herein as portion A, portion B and portion C wherein the $d_{50}$ of portion A is less than the $d_{50}$ of portion B which is less than the $d_{50}$ of portion C. Combining portion A and portion C thereby creating a final population of particles having a total weight and particle size distribution including $d_{95}$ and $d_5$ particle sizes. The distribution's effective width is the difference between the distribution's $d_{95}$ and $d_5$ particle sizes. The distribution's effective width exceeds 100 microns and comprises three abutting and non-overlapping regions including a first region, a second region, and a third region. The first region abuts the second region and the second region abuts the third region. The width of the second region is at least 25% of the effective width. The weight of particles in the second region does not exceed 15% of the final population's total weight and the weight of particles in the first region and the third region each exceed the weight of particles in the second region.

Another embodiment relates to another process for manufacturing a population of ceramic particles. The process may comprise the following steps. Providing a first population of particles and a second population of particles wherein the $d_{90}$ of the first population is less than the $d_{10}$ of the second population. Combining the first population and the second population thereby creating a final population having a total weight and particle size distribution including $d_{95}$ and $d_5$ particle sizes. The distribution has an effective width which is the difference between the distribution's $d_{95}$ and $d_5$ particle sizes. The distribution's effective width exceeds 100 microns and comprises three abutting and non-overlapping regions including a first region, a second region, and a third region. The first region abuts the second region and the second region abuts the third region. The width of the second region is at least 25% of the effective width. The weight of particles in the second region does not exceed 15% of the final population's total weight and the weight of particles in the first region and the third region each exceed the weight of particles in the second region.

DETAILED DESCRIPTION

Figure 1:
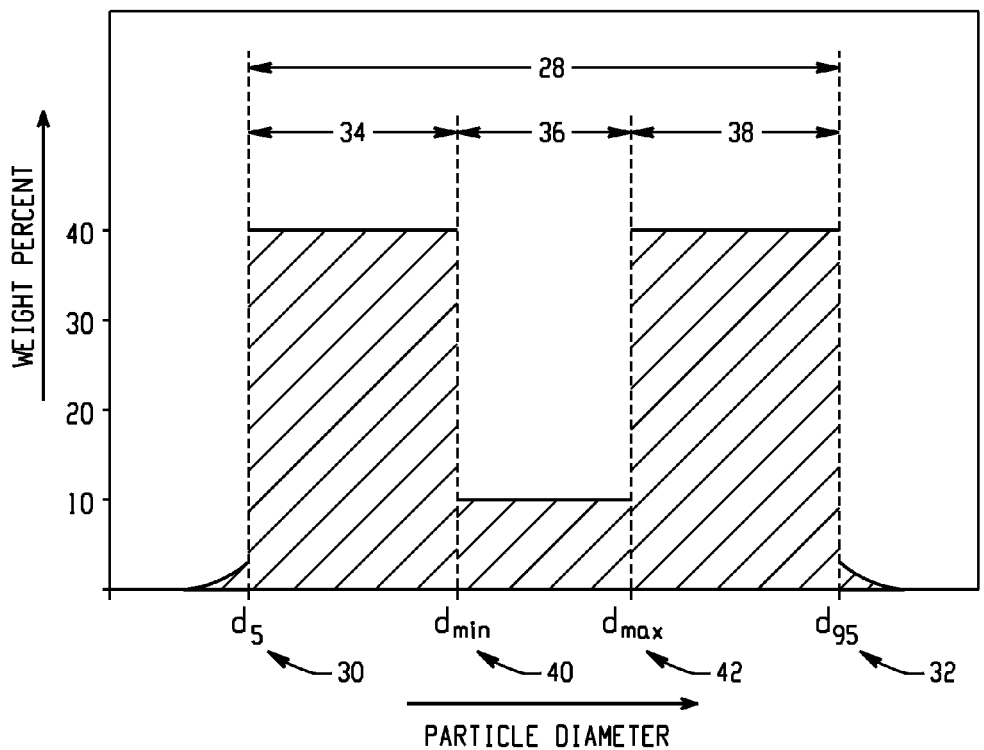
FIG. 1 is a first graph of weight percent versus particle diameter.

As used herein, the phrase "population of ceramic particles" is used as a general description of a plurality of individual, free flowing ceramic particles. Terms such as proppant, abrasive grains and roofing granules describe populations of ceramic particles that are intended for use in specific applications.

As used herein, the terms "proppant" or "proppants" may be used interchangeably to identify a large quantity of ceramic particles that are typically mixed with a fracturing fluid and then forcefully inserted into a well bore. The particles, which may have an average diameter between 200 microns and 2.4 mm, become lodged in fissures created in the geological formation by the fracturing fluid. After the fracturing fluid has been withdrawn, the particles remain in the fissures. As fluids located near the well bore drain through the fissures, into the well and are then pumped to the surface of the well, the individual particles prop open the passageways through the fissures thereby allowing additional fluids to fill the well. Use of proppants may improve the economic performance of the well by enabling the capture of more fluid than would be possible if proppants were not used on the same well.

In order to manufacture large quantities of ceramic particles such as proppants, commercial manufacturers of man-made proppants may use large rotating pan style mixers to mix dry ingredients with wet ingredients and then form a large quantity of manually deformable spherically shaped particles that may be referred to as greenware. The greenware, prior to any further processing such as sorting or heating, may be referred to herein as the original population of particles.

With regard to the dry ingredients used to make the greenware, suitable starting materials include oxides such as aluminum oxides, silicon oxides, magnesium oxides and mixtures thereof. Other exemplary starting materials include clays (which are predominately hydrated alumina), such as kaolin, diaspore clay, burley clay, and flint clay, bauxitic clays, natural or synthetic bauxites, alumino-silicates, magnesium silicates, mixtures thereof and the like. Various sintering aids, such as bentonite clay, iron oxide, boron, boron carbide, aluminum diboride, boron nitride, boron phosphide, other boron compounds, or fluxes, such as sodium carbonate, lithium carbonate, feldspar, manganese oxide, titania, and sodium silicates may be added in amounts up to about ten weight percent to aid sintering. If desired, a binder may be added to the mixture to improve particle formation and to increase the strength of the greenware. Generally the binder is added at about 0-6 percent by weight based on the weight of the oxides. Suitable binder materials include starch, resin or wax, calcium carbonate, or a combination thereof. The dry ingredients may be ground by ball milling or other attrition processes. Prior to grinding, the dry ingredients may be dried to improve the ease of grinding.

In one embodiment, the dry ingredients may be combined with a wet ingredient, such as water, and mixed in an intensive mixer having a rotatable containment vessel provided with a rotor table and a rotatable impacting impeller, such as an Eirich mixer. The rotor table, or pan, rotates in an opposite direction to the impacting impeller. The impacting impeller may be in the form of a disk with rods or bars attached to the disk and aligned generally parallel with the impeller's axis of rotation. Sufficient water is needed to cause essentially spherical particles of the mixture to form. After such particles have formed, additional ceramic powder may be added and the mixer may be further operated to cause accretion of the added material to the particles being formed. The resulting greenware is then dried, usually in a dryer at between about 100° C. and about 300° C., to moisture content of less than about 10 weight percent.

In conventional processes the distribution of particle diameters produced by the agglomerator is so wide that the distribution includes particles that are oversized and particles that are undersized as well as particles that are appropriately sized for use in a well bore. The oversized particles may be too large to function as a proppant because they are difficult to place in the geological formation. The undersized proppants may be too small to function as a proppant because they tend to fill the voids between other appropriately sized proppant particles and thereby reduce the conductivity of a fluid through the proppant pack. Consequently, proppant manufacturers typically remove the oversized and undersized particles in order to produce a commercially viable proppant that has acceptable conductivity and resistance to crushing. However, as the width of the particle size distribution is decreased by eliminating the oversized and undersized particles, the particles remaining in the distribution tend to form a monomodal distribution with better conductivity than the original population but crushing may increase beyond an acceptable level. The oversized and undersized particles are removed from the original population by allowing the particles to flow through a series of screens. Each screen contains a plurality of uniformly shaped and sized holes that allow particles smaller than the screen's hole opening to flow through the screen and prevents particles larger than the screen's hole opening from passing therethrough. As explained above, if the proppant manufacturing process cannot control the diameter of the individual proppant particles as closely as desired, the screening process may need to divert and then recycle large quantities of the original proppant population which are either too large or too small. In some commercial operations, up to 30 weight percent of the proppants are removed during the screening process and then returned to the beginning of the proppant manufacturing process where they can be recovered. Proppant manufacturing processes that yield less than 70 weight percent usable product on a single pass therethrough are known. While the recycled material may be recoverable thereby avoiding a significant economic loss in material cost, the labor involved in manufacturing and recovering 30 weight percent of the greenware is an economic burden which ultimately increases the cost of producing the proppant.

The dried and screened greenware may then be heated in a furnace to an elevated temperature, such as 1000° C. or higher, thereby sintering and/or bonding the agglomerated grains of dry ingredients to one another and forming porous, crush resistant proppant particles. Suitable sintering temperatures are generally about 1200° C. and could be as high as 1500° C.

As will be explained below, one embodiment of a process of this invention reduces the cost of producing the proppant by separating an initial quantity of particles into at least three portions, which are identified herein as portion A, portion B, portion C, and then combining portion A with portion C thereby creating a final proppant population. Portion B may be sold as a separate product without further processing. The savings in labor costs associated with substantially improving the yield of the manufacturing process may significantly improve the economic performance of the proppant manufacturing process.

Proppants may be characterized using one or more physical characteristics including particle size distribution. As used herein, particle size distribution is determined using a CAMSIZER® optical particle size analyzer which is manufactured by Retsch Technology in Germany. The particle size analyzer provides a graph of particle size distribution which may indicate numerous particle size metrics, such as $d_{50}$, which is used to indentify the particle diameter which is less than 50 percent of the particles' diameters and greater than 50 percent of the particles' diameters. Similarly, $d_5$ identifies the particle diameter which is less than 95 percent of the particles' diameters and greater than 5 percent of the particles' diameters. For any distribution, similar values can be calculated for other particle size metrics such as $d_{10}$, $d_{25}$, $d_{75}$ and $d_{90}$.

Another important physical characteristic used to describe proppants is conductivity which may be generally described as a measure of the resistance the proppant exerts on a fluid as the fluid moves through the proppant. Conductivity is determined using the procedure described in ISO 13503-5.

Yet another important characteristic is a proppant's ability to withstand crushing. Crush resistance is a term commonly used to denote the strength of a proppant and may be determined using ISO 13503-2. A strong proppant generates a lower weight percent crushed proppant than a weak proppant at the same closure stress. For example, under the same test conditions, a proppant that has a 2 weight percent crushed proppant is considered to be a strong proppant and is preferred to a weak proppant that has a 10 weight percent crushed proppant.

When proppants are used in drilling operations, the particles are mixed with a fluid which is then forcefully pumped downhole. As the fluid and the particles entrained therein are pumped into the well, some of the particles tend to settle at a faster rate than other particles in the same population of particles. The depth of the well may impact the degree of separation with shallow wells (i.e. less than 2000 meters) experiencing less separation than deep wells (i.e. greater than 4000 meters) if the same mixture of fracturing fluid and proppant are used in each well. This phenomenon may be referred to herein as the "proppant settling problem" which is a widely recognized and persistent problem for the companies that use proppants as part of their process to fracture geological formations. The proppant settling problem may lead to small particles accumulating in one location within the fracture zone while the large particles accumulate in a second location within the fracture zone. The uncontrolled settling of particles within the fracture zone may decrease the effectiveness of the proppant and thereby decrease the economic performance of the well. The inventors of this invention recognized that this problem could be substantially reduced or eliminated by coordinating the selection of the proppants' physical characteristics, such as particle size distributions and specific gravity, and chemical compositions so that most of the particles settle at approximately the same rate. Mixing a first proppant population having a first average particle size and specific gravity with a second proppant population having a different average particle size and specific gravity so that all of the particles in the final population of particles settle at approximately the same rate may substantially resolve the proppant settling problem.

The inventors of this invention have also recognized that coordinating the selection of a first proppant population having a known particle size and specific gravity with a second proppant population having a known particle size and/or specific gravity that is different from the first proppant population's particle size and specific gravity can be used to intentionally create a spectrum of settling rates which can be used to cause a beneficial and controllable difference in the rates at which the particles settle. For example, small particles having a high specific gravity can be made to settle much more rapidly than large particles that have a low specific gravity. If desired, the difference in settling can be accentuated so that most of the small particles enter the fractures in the geological formation and travel as far as possible into the fissures before the larger particles can reach the opening of the fissure. Selectively inserting the smaller particles and then the larger particles may be desirable because it can lead to the prevention of particle back flow which is the undesired removal of particles from fissures as the fracturing fluid is removed.

Shown in FIG. 1 is graph of weight percent versus diameter for a population of ceramic particles of one embodiment of this invention. The effective width of the distribution, see arrow 28, is defined herein as the distance between particle size $d_5$, see arrow 30, and particle size $d_{95}$, see arrow 32. As previously described, the particle size distribution's $d_5$ and $d_{95}$ may be determined using an optical particle size analyzer. Within the effective width there are at least three abutting and non-overlapping regions including first region 34, second region 36 and third region 38. The first region abuts the second region and the second region abuts the third region. The weight of particles in the first region and the weight of particles in the third region each exceed the weight of particles in the second region. In FIG. 1, the weight of particles in the first and third regions is 40 percent of the population's total weight and the weight of particles in the second region is 10 percent. With regard to the mean particle size, also referred to herein as the $d_{50}$, the $d_{50}$ of the first region is inherently less than the $d_{50}$ of the second region which is inherently less than the $d_{50}$ of the third region. Furthermore, the width of the second region, which is defined as the difference between particle size $d_{min}$, see arrow 40, and $d_{max}$, see arrow 42, is approximately 25% of the width of effective width 28.

With regard to the weight percentages of the first, second and third regions, a population of ceramic particles of this invention may have a first region and a third region that are individually between 5 and 85 weight percent of the population's total weight provided the total of the first and third regions does not exceed 90%. The second region does not exceed 15 weight percent of the population's total weight. In some embodiments, the second region may account for no more than 10 weight percent, 5 weight percent or even 0 weight percent of the population's total weight. Weight percentages of the first or third regions between 5 and 85, such as 15, 35, 40.0, 63.5 and 75.7 are also feasible. Similarly, weight percentages of the second region between 0 and 15, such as 3.0, 6.2, 9.5 and 12.1 are feasible.

The boundaries of the first, second and third regions shown in FIG. 1 are defined for use herein as follows. The first region extends from the population's $d_5$ to the second region's $d_{min}$. The third region extends from the second region's $d_{max}$ to the population's $d_{95}$. The second region exists between the first region and third region thereby occupying the region between the $d_{min}$ and the $d_{max}$. For a particular population of ceramic particles, the $d_{min}$ and the $d_{max}$ are the particle sizes that cooperatively define a region which simultaneously: (1) occupies at least 25% of the distribution's width between its $d_5$ and $d_{95}$ particle sizes; (2) the weight percent of the particles in the first region and third region each exceed the weight percent of particles in the second region; and (3) the weight percent of particles in the second region does not exceed 15 weight percent of the population's total weight. The boundaries of the second region (i.e. the particle sizes corresponding to the $d_{mim}$ and the $d_{max}$) may be determined by using a particle size analyzer to determine the particle diameters in the population of particles and then using sieves to determine the weight percent of particles between selected particle diameters.

Figure 2:
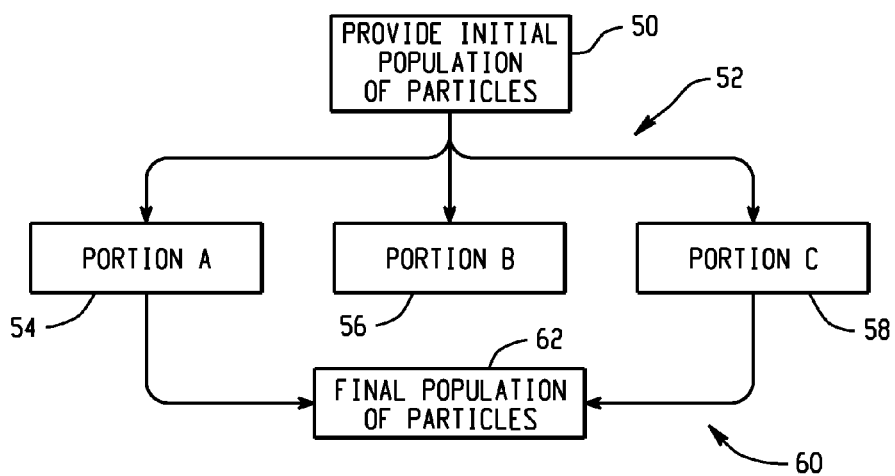
FIG. 2 is a first process flow chart.

Shown in FIG. 2 is a flow chart of a process that may be used to produce an embodiment of a population of ceramic particles of this invention. Step 50 represents providing an initial quantity of particles that have a total weight and particle size distribution. The initial quantity may have a monomodal or multimodal particle size distribution and may be produced using raw materials and conventional equipment, such as spray dryers, high intensity shear mixers and pan agglomerators which are known to those skilled in the art of manufacturing proppant. In step 52, the initial quantity of particles is separated into portion A, portion B and portion C which are identified in FIG. 2 by part numbers 54, 56 and 58, respectively. The $d_{50}$ of portion A is less than the $d_{50}$ of portion B which is less than the $d_{50}$ of portion C. Separating the initial quantity into three portions may be done using an air classification system, a cyclonic separator or a screening mechanism. Step 60 represents combining portion A with portion C to create a final population of ceramic particles 62 that does not include portion B. The particles in portion B may be sold without further screening or other modification thereby avoiding the costs associated with recovering 25 percent or more of the particles from the initial quantity of ceramic particles.

Figure 3:
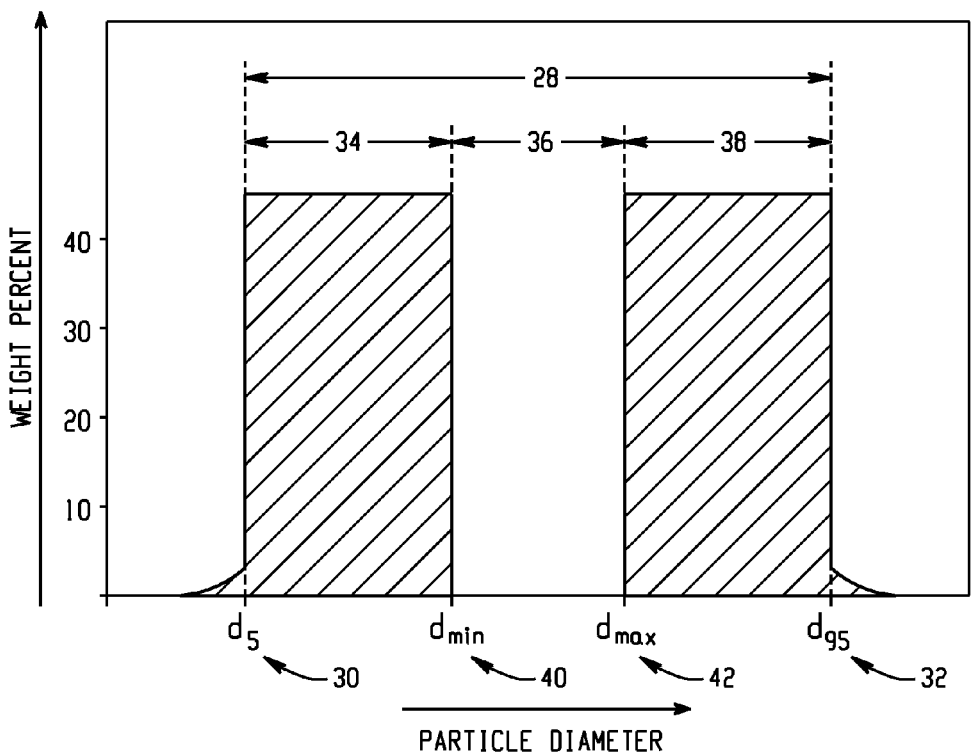
FIG. 3 is a second graph of weight percent versus particle diameter.

FIG. 3 discloses a hypothetical particle size distribution of a plurality of ceramic particles that could be manufactured by the process disclosed in FIG. 2 wherein, after the initial quantity of particles was divided into a portion A, portion B and portion C, portions A and C were combined thereby creating the final population of ceramic particles having the particle size distribution disclosed in FIG. 3. The final population of ceramic particles has a total weight and a particle size distribution including $d_{95}$ and $d_5$ particle sizes. The distribution's effective width, which is the difference between the distribution's $d_{95}$ and $d_5$ particle sizes, exceeds 100 microns and comprises three abutting and non-overlapping regions including first region 34 which abuts second region 36 which abuts third region 38. The width of the second region is at least 25% of the effective width and the weight of particles in the second region does not exceed 15% of the final population's total weight. Furthermore, the weight of particles in the first region and the third region each exceed the weight of particles in the second region.

Another process for manufacturing an embodiment of the applicant's invention will be described with reference to FIG. 4 wherein step 80 represents providing a first quantity of particles having a $d_{90}$ particle size. Step 82 represents providing a second quantity of particles having a particle size distribution having a $d_{10}$ particle size. The first and second quantities of particles are selected so that the $d_{90}$ of the first quantity is less than the $d_{10}$ of the second quantity. In step 84, the first and second quantities are then mixed to create a final population of ceramic particles. The final population has a particle size distribution including a $d_5$ and $d_{95}$ particle sizes. The distribution has an effective width which is the difference between the $d_{95}$ and $d_5$ particle sizes. The effective width exceeds 100 microns and comprises three abutting and non-overlapping regions including a first region which abuts a second region which, in turn, abuts a third region. The weight of particles in the first region and the third region each exceed the weight of particles in the second region. The width of the second region's particle size distribution is at least 25% of the width of the final population's effective width.

Figure 4:
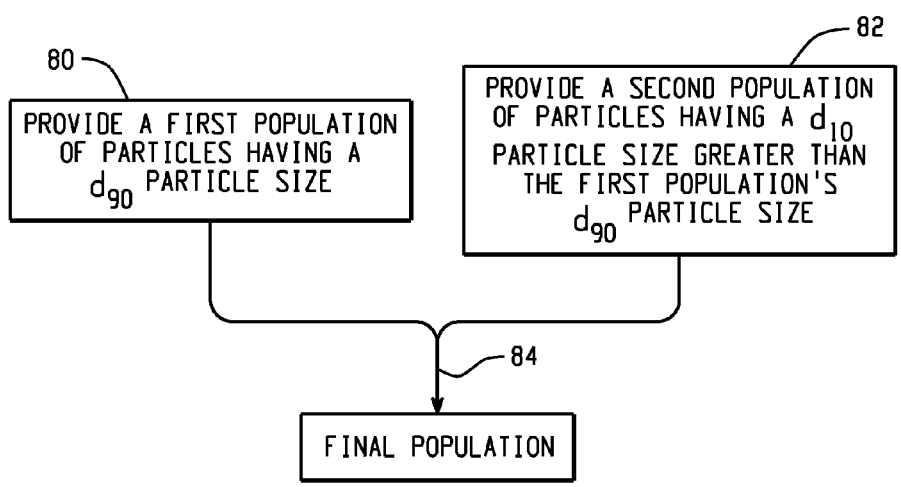
FIG. 4 is a second process flow chart.

With regard to the process disclosed in FIG. 4, the first quantity of particles has an average specific gravity and particle size distribution. The second quantity of particles has an average specific gravity and particle size distribution. In some embodiments, the average specific gravity of the particles in the second quantity may be at least 10% less than the average specific gravity of the particles in the first quantity. If desired, the average specific gravity of the particles in the second quantity may be 15%, 20% or even 25% less than the average specific gravity of the particles in the first quantity. By coordinating the selection of the particle size distributions and average specific gravities, the first quantity of particles can be made to settle at approximately the same rate as the second quantity of particles. In some embodiments, controlling the average specific gravity of the second quantity of particles to at least 10 weight percent less than the average specific gravity of the first quantity of particles will substantially mitigate or prevent undesirable particle settling.

If as in the process disclosed in FIG. 4 two different populations of particles are combined to manufacture an embodiment of a population of ceramic particles of this invention, then both the physical (i.e. specific gravity and particle size distribution) and chemical (i.e. compositions) characteristics of the first and second quantities may be independently selected to create a final population. For example, in one embodiment a population of ceramic particles of this invention may have a particle size distribution which has first region 34, second region 36 and third region 38 as shown in FIG. 3. In this embodiment there are no particles in the second region. The particles in first region 34 may be chemically identical to particles in the third region 38. Alternatively, the particles in the first region may have a first chemical composition and the particles in the third region may have a second chemical composition which is chemically distinct from the first chemical composition. As used herein, two chemical compositions are considered to be "chemically distinct" if: (1) the compositions do not contain at least one chemical compound in common; or (2) if the compositions do contain at least one compound in common then there is at least a 10 weight percent difference, based on the total weight of the composition, between the amount of the compound in the first composition and the amount of the compound in the second composition. An x-ray fluorescent (XRF) analytical apparatus may be used to determine the quantities of compounds such as $Al_2O_3$ and $SiO_2$. For example, in a first embodiment, if the entire population of particles in the population of ceramic particles is made from bauxite which has a first chemical composition that includes at least 30 weight percent $Al_2O_3$, then the chemical compositions of the regions are not chemically distinct. In a second embodiment, if the particles in the first region are made from bauxite and the particles in the third region have a chemical composition that includes less than 1 weight percent $Al_2O_3$ and at least 50 weight percent $SiO_2$, then the compositions of the first and third regions are chemically distinct. In the second embodiment, the particles in the third region may include sand. In a third embodiment, if the particles in the first region are made from bauxite and thereby have 60 weight percent or more $Al_2O_3$ while the particles in the third region are made from clay that includes less than 50 weight percent $Al_2O_3$ then the compositions of the first and third regions are chemically distinct.

With regard to the packing of proppant particles when they are inserted in a fissure in a geological formation, the distribution of the proppant particles' diameters may impact the physical arrangement of the packed particles which could impact the proppant's crush strength and conductivity. Consider, for example, a proppant pack that includes a mixture of three different size proppant particles having average diameters of $D_1$, $D_2$ and $D_3$, respectively, wherein the smallest diameter particles have an average diameter equal to $D_1$, the medium diameter particles have an average diameter equal to $D_2$ and the largest particles have an average diameter equal to $D_3$. Within the pack, the largest diameter particles may frequently abut one another thereby forming an essentially continuous matrix that defines numerous passageways there between. The medium size particles and smallest size particles may be selected to readily fill the passageways between the largest particles. Because the largest diameter particles form a matrix through the pack, the crush resistance of the largest particles essentially determines the crush resistance of the proppant pack. Within the same pack, the smallest and medium diameter particles may have little impact on the proppant pack's crush resistance because they fit within the voids created by the matrix but, at the same time, the small and medium size particles may reduce the conductivity of the proppant pack by filling the voids between the large particles thereby blocking the passageways through which a fluid could flow. In contrast, a distribution of proppant particles may be selected so that the smallest and/or medium diameter particles are too large to fit within the voids created by the large particles thereby forcing many of larger particles away from one another and reducing the number of contact points between the large particles. This disruption to the packing pattern of the large particles may be facilitated by selecting a population of particles wherein the ratio of the particle's $d_5$:$d_{95}$ exceeds 0.22. Populations of particles that have a $d_5$:$d_{95}$ ratio greater than 0.30 or even 0.35 are feasible. Populations of particles that have a $d_5$:$d_{95}$ ratio greater than 0.22 may be advantageous for two reasons. First, the disrupted packing pattern may create many more points of contact between the largest particles and the smaller particles thereby distributing the force applied to the pack over a broader area which results in improved resistance to crushing. Second, the passageways defined by the largest particles are forced open by the medium and smallest diameter particles thereby facilitating the flow of a fluid through the proppant pack. In certain embodiments, a proppant of this invention may contain a unique distribution of particle sizes that collectively provide resistance to crushing, resistance to settling during the fracturing process and conductivity of fluid through the proppant. These desirable performance characteristics are believed to be due at least in part to the particles' ability to pack in a disrupted packing pattern.

EXAMPLES

To illustrate an embodiment of a population of ceramic particles of this invention, the inventors manufactured a population of proppants as follows. The starting raw materials included: 400 kg of Arkansas bauxite, which had been previously ground to an average particle size of about 10 microns; 7 kg of a commercially available corn starch binder; and 113 kg (250 lbs.) of water added to a rotating Eirich mixer which is a well known agglomerator. The raw materials filled the chamber of the mixer approximately two-thirds full. Rotation of the table and impeller were continued for approximately 1.5 minutes until particles of a suitable size were formed. Approximately 100 kg of additional bauxite was slowly added thereby coating the previously formed particles with a layer of material. Rotation of the table and impeller were continued for approximately 4 minutes thereby resulting in the formation of spherical particles which may be referred to herein as greenware. The particles were then dried in a dryer at 200° C. until the moisture content of the particles was less than 10%. To achieve the desired density and strength, the dried particles were then heated to 1400° C. for approximately one hour. The resulting particles had a sphericity of about 0.9, as determined using the Krumbein and Sloss chart.

The entire population of particles exiting the drying oven but prior to flowing through the furnace is defined herein as the parent population of particles. After heat treatment in a furnace at 1400° C., the parent population of particles was screened by directing the particles to flow through a first commercial screening device which contained, in a linear arrangement, a 14 mesh screen and then a 50 mesh screen. The first screening device removed particles that either (a) did not flow through the 14 mesh screen or (b) did flow the 50 mesh screen, thereby leaving a population of proppants that were small enough to flow through a 14 mesh screen and too large to flow through a 50 mesh screen. This population of particles is defined herein as the initial population of particles and is designated Lot 1 in Table 1. Lot 1 was made to flow through a second screening process which included a commercial screening device that contained a 20 mesh screen and a 35 mesh screen. The second screening device diverted and captured the particles into three separate portions. Portion A contained particles that had flowed through the 14 mesh screen in the first screening device but were too large to flow through the 20 mesh screen. The particles in portion B were small enough to flow through the 20 mesh screen and too large to flow through the 35 mesh screen and are designated Lot 2 in Table 1. The particles in portion C were small enough to flow through the 35 mesh screen but too large to flow through the 50 mesh screen in the first screening device. The particles in portion A and portion C were recombined thereby creating the final proppant population which is designated Lot 3 in Table 1. The particles in portion B were permanently separated from the final proppant population.

Shown below in Table 1 are the pertinent characteristics of each proppant. All numerical values, except for percentages, are in microns.

TABLE 1

| Lots | $d_5$ | $d_{min}$ | $d_{max}$ | $d_{95}$ | Effective Width[1] | Gap Size[2] | Gap %[3] | Amount[4] (weight percent) Region | | |
|---|---|---|---|---|---|---|---|---|---|---|
| | | | | | | | | I | II | III |
| 1 | 440 | — | — | 1150 | 710 | — | — | — | — | — |
| 2 | 513 | — | — | 923 | 410 | — | — | — | — | — |
| 3 | 398 | 570 | 810 | 1267 | 869 | 240 | 27.6 | 17.2 | 3.8 | 69.0 |

[1] Effective Width is the difference between the distribution's $d_{95}$ and $d_5$.
[2] Gap Size is the width of the second region which is the difference between the distribution's $d_{max}$ and $d_{min}$.
[3] Gap % is the Gap Size divided by the Effective Width.
[4] Amount is the weight of particles in each region divided by the weight of particles in the final population.

The data clearly demonstrates that the population of particles of this invention, as represented by Lot 3, met the following criteria. First, the population's effective width exceeded 100 microns. Second, the width of the second region (i.e. the Gap %) was at least 25% of the Effective Width. Third, the weight percent of particles in the second region was less than 15% of the final population's weight. Fourth, the weight percent of particles in the first region and the third region each exceeded the weight percent of particles in the second region.

To illustrate the advantage obtained by an embodiment of a proppant of this invention, the crush resistance of the initial population, final population and proppant in portion B were measured at pressures of 68.9 MPa (10,000 psi), 103.4 MPa (15,000 psi) and 137.9 MPa (20,000 psi) using the procedure described in ISO 13503-2. Each of the crush resistance values in Table 2 represents an average of three samples. The crush resistance values are expressed as a weight percent of the sample's starting weight. The lower the number, the better the resistance to crushing.

TABLE 2

| | Crush Resistance (weight percent) | | |
|---|---|---|---|
| Lots | 68.9 MPa | 103.4 MPa | 137.9 MPa |
| 1 (initial) | 5.3 | 12.5 | 15.6 |
| 2 (portion B) | 9.9 | 20.8 | 28.7 |
| 3 (final) | 6.0 | 12.0 | 16.6 |

The data in Table 2 demonstrates that for an embodiment of a proppant of this invention the final proppant population (i.e. Lot 3) had a crush resistance which is both (a) approximately equivalent to the crush resistance of the initial proppant population (i.e. Lot 1) and (b) lower and therefore better than the crush resistance of the proppant portion B (i.e. Lot 2) which were removed and available as a separate product. In sharp contrast to conventional proppant manufacturing processes wherein only the proppants in portion B were commercially valuable and the proppants in portions A and C were recycled, the proppants in portions A and C of this invention were combined to create a final proppant with a crush resistance better than the proppants in portion B. The ability to avoid the costs inherent in recycling large percentages of the initial proppant population may provide a distinct economic advantage to the proppant manufacturer.

The above description is considered that of particular embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the Doctrine of Equivalents.

What is claimed is:

1. A population of ceramic particles, comprising:
   a. a plurality of individual, free flowing ceramic particles, said plurality of particles having a total weight and particle size distribution including $d_{95}$ and $d_5$ particle sizes;
   b. said distribution has an effective width which is the difference between the distribution's $d_{95}$ and $d_5$ particle sizes, said distribution's effective width exceeds 100 microns and comprises three abutting and non-overlapping regions including a first region, a second region, and a third region wherein the first region abuts the second region and the second region abuts the third region; and wherein the width of said second region is at least 25% of the effective width;
   c. wherein the weight of particles in said second region does not exceed 15% of the plurality of particle's total weight and the weight of particles in said first region and said third region each exceed the weight of particles in said second region; and
   d. wherein said population of particles have an average diameter between 220 microns and 2.4 mm.

2. The population of claim 1 wherein the ratio of $d_5:d_{95}$ exceeds 0.22.

3. The population of claim 1 wherein the ratio of $d_5:d_{95}$ exceeds 0.30.

4. The population of claim 1 wherein the width of said second region is at least 30% of the effective width.

5. The population of claim 1 wherein the weight of the particles in said first region exceeds at least 5 percent of the plurality of particles' total weight.

6. The population of claim 5 wherein the weight of the particles in said first region exceeds at least 15 percent of the plurality of particles' total weight.

7. The population of claim 1 wherein the weight of the particles in said third region exceeds at least 5 percent of the plurality of particles' total weight.

8. The population of claim 7 wherein the weight of the particles in said third region exceeds at least 15 percent of the plurality of particles' total weight.

9. The population of claim 8 wherein the weight of the particles in said third region exceeds at least 40 percent of the plurality of particles' total weight.

10. The population of claim 9 wherein the weight of the particles in said second region does not exceed 10 percent of the plurality of particle's total weight.

11. The population of claim 1 wherein the weight of the particles in said second region does not exceed 10 percent of the plurality of particle's total weight.

12. The population of claim 1 wherein the weight of the particles in said second region does not exceed 5 percent of the plurality of particle's total 13. A process, for manufacturing a population of ceramic particles, comprising the steps of:
    a. providing a first quantity of particles and a second quantity of particles, wherein the $d_{90}$ of the first quantity is less than the $d_{10}$ of the second quantity and the difference between the average specific gravity of the particles in the first quantity and the average specific gravity of the particles in the second quantity is at least 15% of the first quantity's average specific, gravity, and
    b. combining the first quantity and the second quantity thereby creating a final population of ceramic particles having a total weight and particle size distribution including $d_{95}$ and $d_5$ particle sizes, said distribution has an effective width which is the difference between the distribution's $d_{95}$ and $d_5$ particle sizes, said distribution's effective width exceeds 100 microns and comprises three abutting and non-overlapping regions including a first region, a second region, and a third region wherein the first region abuts the second region and the second region abuts the third region; wherein the width of said second region is at least 25% of the effective width; and wherein the weight of particles in said second region does not exceed 15% of said final population of ceramic particles' total weight and the weight of particles in said first region and said third region each exceed the weight of particles in said second region.

14. The process of claim 13 wherein the particles in the first quantity have an average specific gravity, the particles in the second quantity have an average specific gravity and the difference between the first quantity's average specific gravity and the second quantity's average specific gravity is at least 10% of the first quantity's average specific gravity.

15. The process of claim 13 wherein said particles in said first quantity have a first chemical composition, said particles in said second quantity have a second chemical composition, and the chemical compositions are chemically distinct from each other.

16. The process of claim 15 wherein at least one of said chemical compositions comprises at least 50 weight percent $SiO_2$.

17. The process of claim 15 wherein only one of said chemical compositions comprises at least 50 weight percent $SiO_2$.

18. The process of claim 17 wherein said at least one of said chemical compositions comprising at least 50 weight percent $SiO_2$ comprises sand.

19. The process of claim 15 wherein only one of said chemical compositions comprises at least 30 weight percent $Al_2O_3$.

* * * * *